(12) United States Patent
Saiki

(10) Patent No.: US 8,014,667 B2
(45) Date of Patent: Sep. 6, 2011

(54) IMAGING DEVICE

(75) Inventor: Jun Saiki, Osaka (JP)

(73) Assignee: Panasonic Corporation, Osaka (JP)

( * ) Notice: Subject to any disclaimer, the term of this patent is extended or adjusted under 35 U.S.C. 154(b) by 119 days.

(21) Appl. No.: 12/175,260

(22) Filed: Jul. 17, 2008

(65) Prior Publication Data

US 2009/0023008 A1 Jan. 22, 2009

(30) Foreign Application Priority Data

Jul. 20, 2007 (JP) ................................ 2007-189007

(51) Int. Cl.
*G03B 17/02* (2006.01)

(52) U.S. Cl. ........................................................ 396/535

(58) Field of Classification Search ................... 396/535, 396/540–542; 348/373, 374, 375–376; 206/316.1, 206/316.2

See application file for complete search history.

(56) References Cited

U.S. PATENT DOCUMENTS

| | | | | |
|---|---|---|---|---|
| 2001/0026689 A1* | 10/2001 | Ito | ................................. | 396/535 |
| 2005/0074234 A1* | 4/2005 | Takanashi | .................... | 396/535 |
| 2006/0171708 A1* | 8/2006 | Iwata et al. | .................. | 396/535 |

FOREIGN PATENT DOCUMENTS

JP 2000-227628 8/2000

* cited by examiner

*Primary Examiner* — W. B. Perkey
*Assistant Examiner* — Minh Phan
(74) *Attorney, Agent, or Firm* — Dickinson Wright PLLC

(57) ABSTRACT

An imaging device is provided, in which a front sheet metal casing and/or a back sheet metal casing can be secured to a top sheet metal casing without the necessity of providing any screw holes in the top surface of the top sheet metal casing in order to secure the top sheet metal casing to the front sheet metal casing and/or the back sheet metal casing. The top sheet metal casing includes a top plate and a secured sheet metal casing secured to the top plate such that at least a portion of its perimeter is spaced apart from the top plate at a predetermined distance. A flange provided to the front or back sheet metal casing is inserted between the top plate and the secured sheet metal plate, so that an engagement pin provided to the secured sheet metal plate is fitted in an engagement hole provided in the flange, thereby securing the front or back sheet metal casing to the top sheet metal casing.

3 Claims, 4 Drawing Sheets

IMAGING DEVICE

FIELD OF THE INVENTION

The present invention relates to imaging devices, and particularly to an imaging device using sheet metal for its exterior members.

BACKGROUND OF THE INVENTION

Conventionally, imaging devices provided with front, back, and top sheet metal casings have been manufactured and sold (see, for example, Japanese Laid-Open Patent publication No. 2000-227628). In such a conventional imaging device, the top sheet metal casing is secured at its side surfaces to the front or back sheet metal casing by screws.

However, in such a conventional imaging device configuration, the top surface of the top sheet metal casing is not secured to the front and back sheet metal casings. Therefore, for example, when the front or back sheet metal casing is deflected, a gap is created between the top sheet metal casing and the front or back sheet metal casing, which is undesirable in appearance.

To solve such a problem, one possible option is to provide screw holes in the top surface of the top sheet metal casing and secure the top sheet metal casing at the top surface to the front and back sheet metal casings. However, such a configuration is undesirable from the perspective of design because of the screw holes provided in the top surface of the top sheet metal casing.

BRIEF SUMMARY OF THE INVENTION

Therefore, an object of the present invention is to provide an imaging device in which a front sheet metal casing and/or a back sheet metal casing can be secured to a top sheet metal casing without the necessity of providing any screw holes in the top surface of the top sheet metal casing in order to secure the top sheet metal casing to the front sheet metal casing and/or the back sheet metal casing.

To attain the above object, the present invention provides an imaging device with exterior members including a top sheet metal casing secured to a front sheet metal casing or a back sheet metal casing, wherein, the top sheet metal casing includes a top plate, and a catch plate secured to the top plate such that at least a portion of its perimeter is spaced apart from the top plate at a predetermined distance, the front sheet metal casing or the back sheet metal casing has an insertion portion disposed between the top plate and the catch plate, and the catch plate and the insertion portion have their respective securing portions configured to secure the insertion portion to the catch plate.

In this case, a projection may be provided to the catch plate so as to project toward the top plate, a recess may be provided in the insertion portion so as to receive the projection, and the projection may be fitted in the recess to secure the insertion portion to the catch plate.

Alternatively, a projection may be provided to the insertion portion so as to project toward the catch plate, a recess may be provided in the catch plate so as to receive the projection, and the projection may be fitted in the recess to secure the insertion portion to the catch plate.

In addition, the insertion portion may be disposed between the top plate and the catch plate, and the catch plate may be biased toward the top plate so as to be pressed upon the insertion portion.

The present invention allows the front sheet metal casing and/or the back sheet metal casing to be secured to the top sheet metal casing without the necessity of providing any screw holes in the top surface of the top sheet metal casing in order to secure the top sheet metal casing to the front sheet metal casing and/or the back sheet metal casing.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
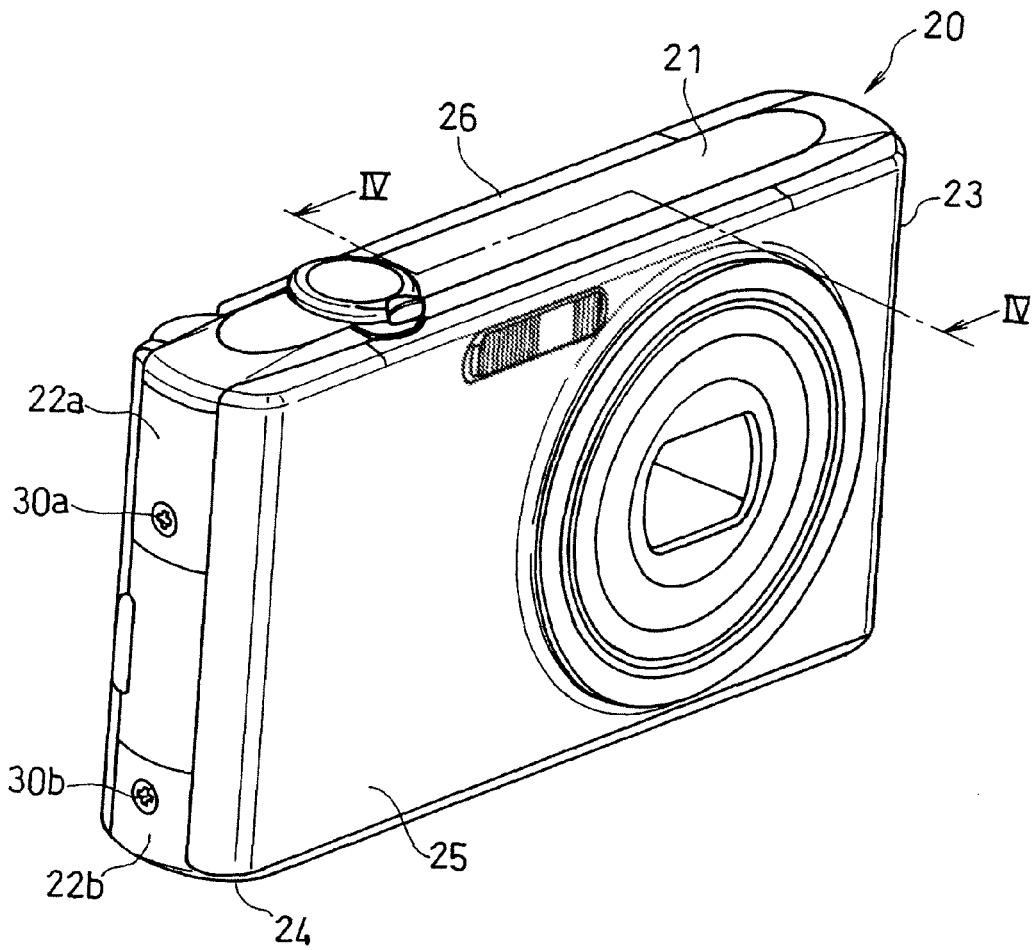
FIG. 1 is a perspective view generally illustrating a digital still camera according to an embodiment of the present invention.
Figure 2:
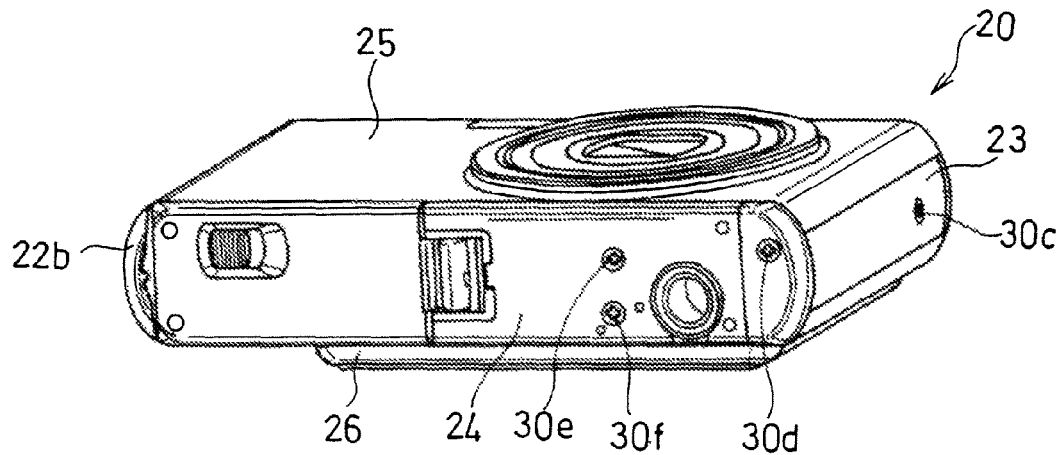
FIG. 2 is a perspective view of the digital still camera as viewed from the bottom.
Figure 3:
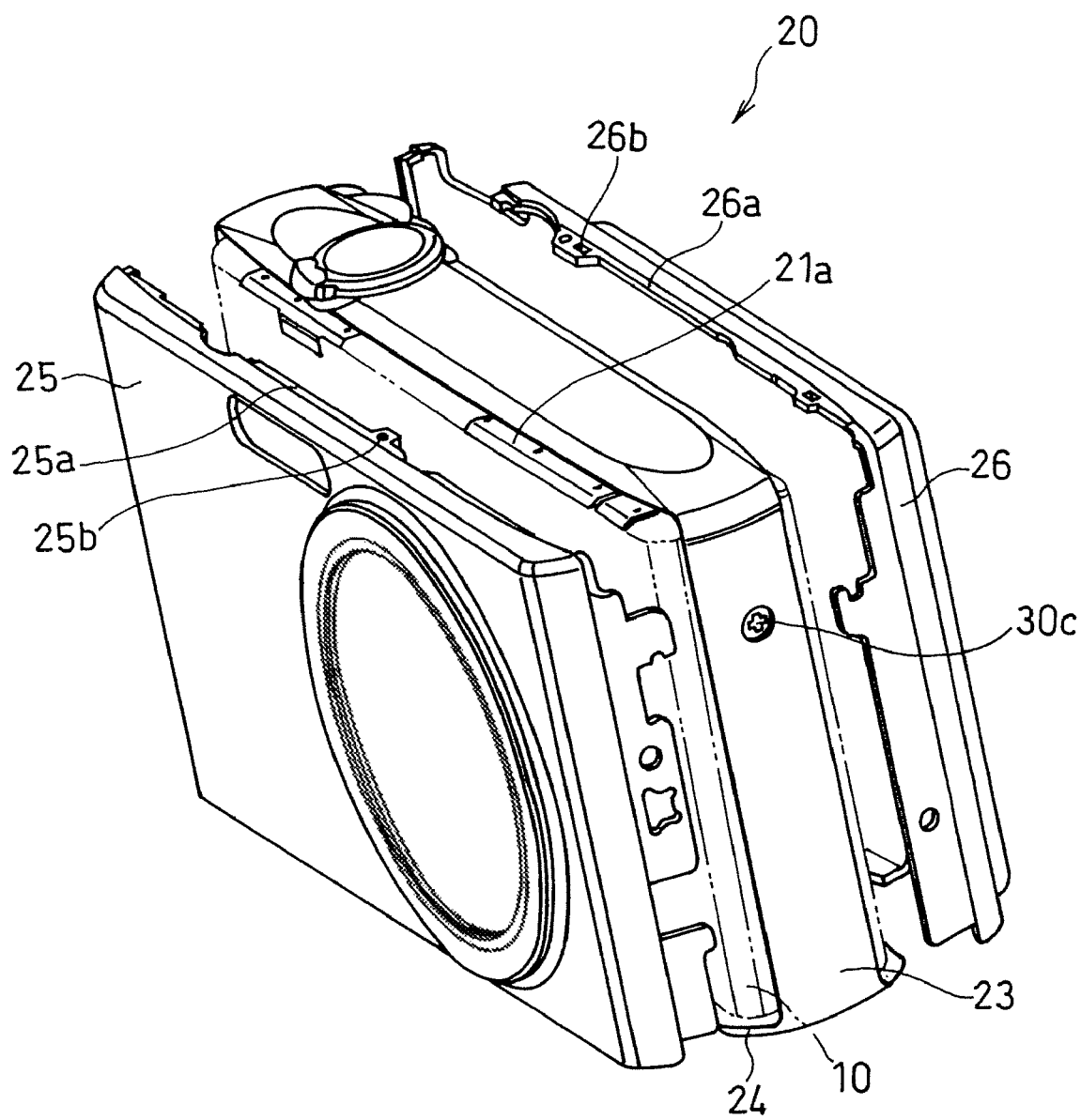
FIG. 3 is an exploded perspective view of the digital still camera.

Hereinafter, the present invention will be described with respect to an exemplary application to a digital still camera (hereinafter, simply referred to as a "camera") with reference to FIGS. 1, 2, and 3. FIG. 1 is a perspective view of a camera 20 according to an embodiment of the present invention. FIG. 2 is a perspective view of the camera 20 as viewed from the bottom. FIG. 3 is an exploded perspective view of the camera 20. Note that in FIG. 3, a body unit 10 is only outlined for brevity.

A front sheet metal casing 25, a back sheet metal casing 26 (see FIG. 3), a top sheet metal casing 21, and a bottom sheet metal casing 24 (see FIG. 2) are secured together to form the exterior of the camera 20.

A left-side sheet metal casing 22a is secured to the top sheet metal casing 21. The front sheet metal casing 25, the back sheet metal casing 26, and the left-side sheet metal casing 22a are fastened together by a screw 30a.

A left-side sheet metal casing 22b and a right-side sheet metal casing 23 are secured to the bottom sheet metal casing 24. The front sheet metal casing 25, the back sheet metal casing 26, and the left-side sheet metal casing 22b are fastened together by a screw 30b. The front sheet metal casing 25, the back sheet metal casing 26, and the right-side sheet metal casing 23 are fastened together by a screw 30c.

The top sheet metal casing 21, the left-side sheet metal casing 22a, the left-side sheet metal casing 22b, the right-side sheet metal casing 23, and the bottom sheet metal casing 24 are secured to the camera body unit 10 using the screws 30a, 30b, and 30c, as well as screws 30d, 30e, and 30f, as shown in FIG. 3. Note that the screw 30c is shown in FIG. 3 being tightened into the right-side sheet metal casing 23, but it is in fact used for fastening together the front sheet metal casing 25, the back sheet metal casing 26, and the right-side sheet metal casing 23 after these casings are attached in place.

The front sheet metal casing 25 and the back sheet metal casing 26 are attached in place after the top sheet metal casing 21, the left-side sheet metal casing 22a, the left-side sheet metal casing 22b, the right-side sheet metal casing 23, and the bottom sheet metal casing 24 are attached to the camera body unit 10.

Here, the front sheet metal casing 25 has a flange 25a provided thereto, and the back sheet metal casing 26 has a flange 26a provided thereto. The flanges 25a and 26a are plate-like portions projecting toward the top sheet metal casing 21. The flanges 25a and 26a have their respective engagement holes 25b and 26b.

Figure 4:
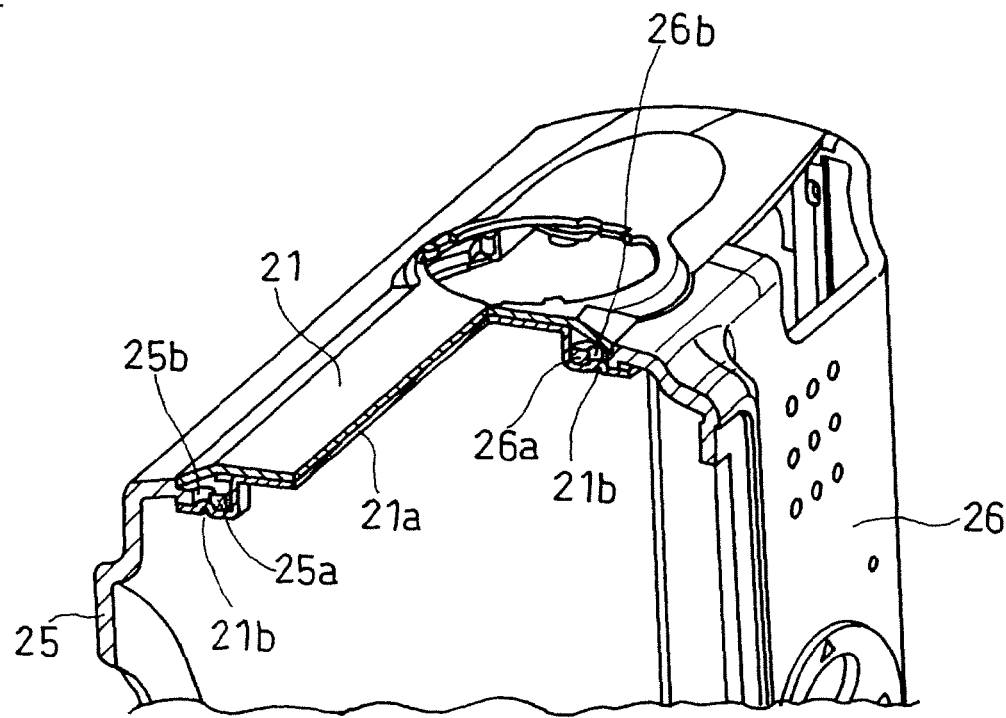
FIG. 4 is a perspective view illustrating a partial cross section of the digital still camera.

FIG. 4 is a perspective view illustrating a substantial portion taken along line IV-IV in FIG. 1, including the top sheet metal casing 21, the front sheet metal casing 25, and the back sheet metal casing 26. The top sheet metal casing 21 includes a top plate and a secured sheet metal casing 21a. The secured sheet metal casing 21a is secured to the top plate by spot welding. The secured sheet metal casing 21a is secured to the top plate such that at least a portion of its perimeter is spaced apart from the top plate at a predetermined distance. The secured sheet metal casing 21a has two engagement pins 21b formed on the perimeter.

When attaching the front sheet metal casing 25 to the camera body unit 10, the flange 25a is inserted between the secured sheet metal casing 21a and the top plate. As a result, one of the engagement pins 21b is fitted in the engagement hole 25b, so that the front sheet metal casing 25 is secured to the top sheet metal casing 21.

Also, when attaching the back sheet metal casing 26 to the camera body unit 10, the flange 26a is similarly inserted between the secured sheet metal casing 21a and the top plate. As a result, the other engagement pin 21b is fitted in the engagement hole 26b, so that the back sheet metal casing 26 is secured to the top sheet metal casing 21.

Figure 5:
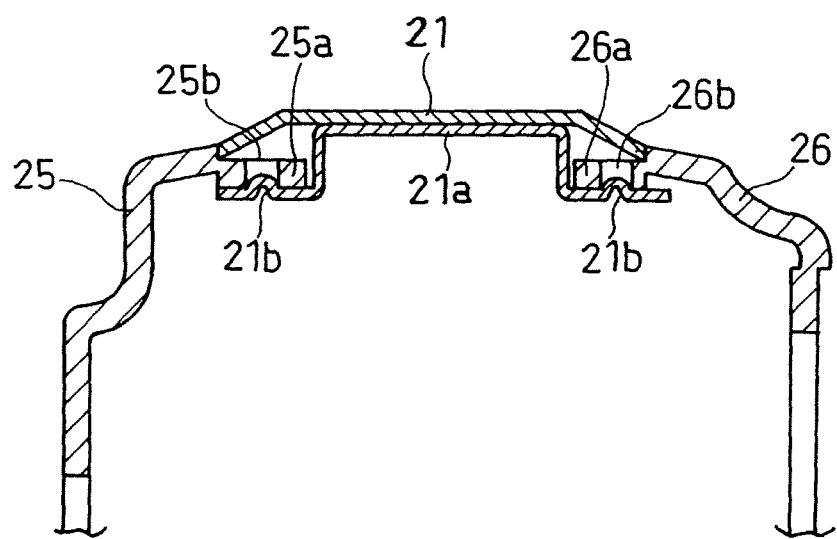
FIG. 5 is a partial cross-sectional view of the digital still camera.

FIG. 5 illustrates exterior members thus connected. In FIG. 5, the two engagement pins 21b are fitted in their respective engagement holes 25b and 26b. Also, the secured sheet metal casing 21a is biased toward the top plate so as to be pressed upon the flanges 25a and 26a.

As a result, the front sheet metal casing 25 and the back sheet metal casing 26 are secured to the top sheet metal casing 21. Therefore, even if the front sheet metal casing 25 and the back sheet metal casing 26 are deflected, no gaps are created between the front sheet metal casing 25 and the top sheet metal casing 21, and between the back sheet metal casing 26 and the top sheet metal casing 21. Also, by forming the front sheet metal casing 25, the back sheet metal casing 26, and the secured sheet metal casing 21a using conductive materials, it becomes possible to electrically connect these exterior members together, thereby enhancing resistance to electrical leakage.

Figure 6:
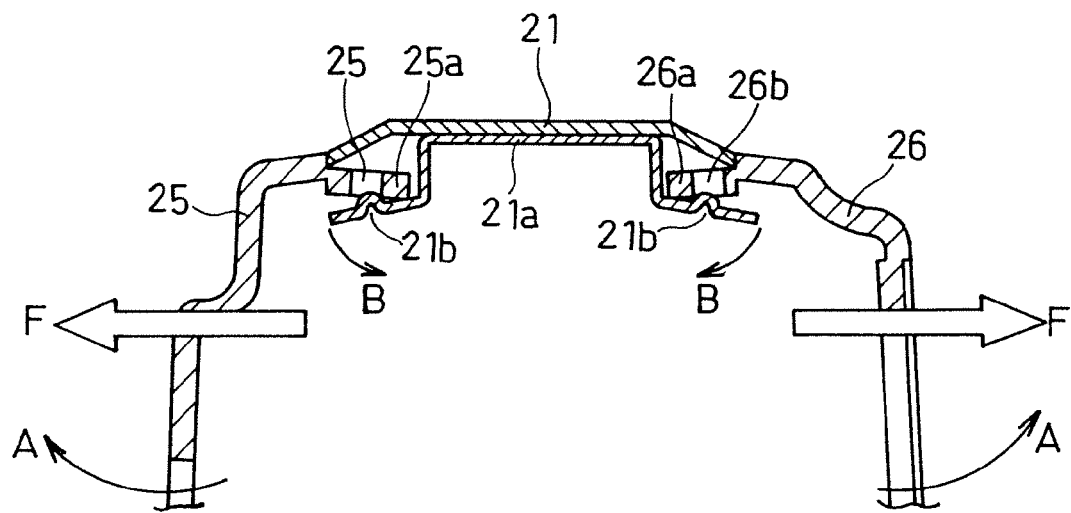
FIG. 6 is a partial cross-sectional view of the digital still camera.

Next, an operation of detaching the front sheet metal casing 25 and the back sheet metal casing 26 for repairs or suchlike will be described with reference to FIG. 6. In such an operation, the front sheet metal casing 25 and the back sheet metal casing 26 are lifted from their bottom, and force is applied thereto in the directions indicated by thick arrows F so as to incline the front sheet metal casing 25 and the back sheet metal casing 26 as indicated by arrows A. As a result, the flanges 25a and 26a press the secured sheet metal casing 21a downward in the directions indicated by arrows B, so that the engagement pins 21b are disengaged from their respective engagement holes 25b and 26b, thereby allowing the front sheet metal casing 25 and the back sheet metal casing 26 to be detached from the top sheet metal casing 21.

Note that the exterior plate of the top sheet metal casing 21 is merely an exemplary top plate in the present invention. The secured sheet metal casing 21a is merely an exemplary catch plate in the present invention. The flanges 25a and 26a are merely exemplary insertion portions in the present invention. A combination of the engagement pin 21b and the engagement hole 25b or 26b constitutes merely an exemplary securing portion in the present invention. Furthermore, the engagement pins 21b are merely exemplary projections provided to the catch plate in the present invention. The engagement holes 25b and 26b are merely exemplary recesses provided in the insertion portions in the present invention. The camera 20 is merely an exemplary imaging device in the present invention.

As described above, the present invention can be embodied as the camera 20 illustrated in the present embodiment, but is not limited to the present embodiment. Variants of the present invention will now be described together below.

Figure 7:
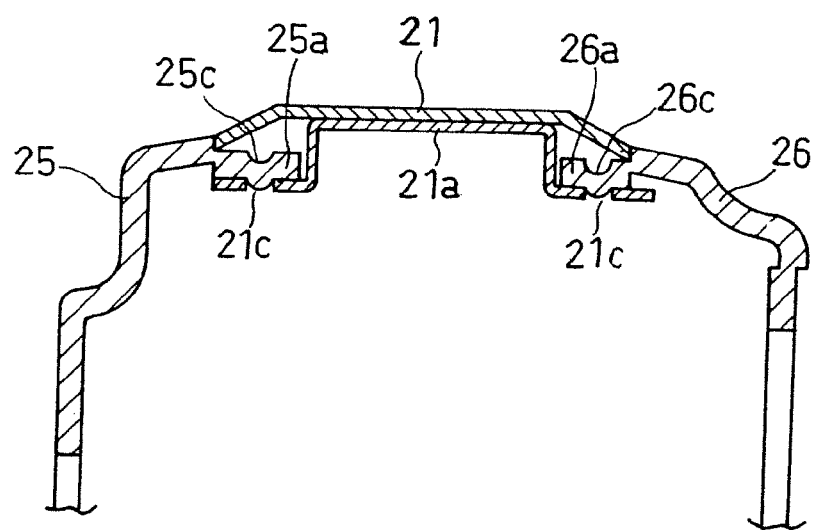
FIG. 7 is another partial cross-sectional view of the digital still camera.

In the present embodiment, the secured sheet metal casing 21a is provided with the engagement pins 21b, and the flanges 25a and 26a are provided with the engagement holes 25b and 26b, respectively, but the present invention is not limited thereto. For example, recesses 21c may be provided in the secured sheet metal casing 21a, and projections 25c and 26b may be provided to the flanges 25a and 26a, respectively, as shown in FIG. 7.

Also, while the present embodiment has been conveniently described, focusing on securing the top sheet metal casing 21 to the front sheet metal casing 25 and the back sheet metal casing 26, the present invention is also applicable to the case where the bottom sheet metal casing 24 is secured to the front sheet metal casing 25 and the back sheet metal casing 26.

Also, while the above embodiment illustrates the example where the top sheet metal casing 21 is secured to both the front sheet metal casing 25 and the back sheet metal casing 26, the present invention is also applicable to the case where the top sheet metal casing 21 is secured to only one of the front sheet metal casing 25 and the back sheet metal casing 26.

The present invention is applicable to imaging devices with their exteriors formed by a plurality of sheet metal casings secured together. Concretely, the present invention is applicable to digital still cameras, video movie cameras, camera-equipped cell phones, etc.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. An imaging device comprising exterior members including a top sheet metal casing secured to a front sheet metal casing or a back sheet metal casing, wherein, the top sheet metal casing has a multi-layered structure including a top plate, and a catch plate secured to the top plate such that at least a portion of its perimeter is spaced apart from the top plate at a predetermined distance, the front sheet metal casing or the back sheet metal casing has an insertion portion disposed between the top plate and the catch plate that are spaced apart at said predetermined distance, and in a completely assembled state of the top sheet metal casing with the front sheet metal casing or the back sheet metal casing, the insertion portion is disposed between the top plate and the catch plate with the catch plate being deformed so as to enlarge said predetermined distance, the catch plate is biased toward the top plate and pressed upon the insertion portion, and the insertion portion is secured to the catch plate.

2. The imaging device according to claim 1, wherein,
a projection is provided to the catch plate so as to project toward the top plate,
a recess is provided in the insertion portion so as to receive the projection, and
the projection is fitted in the recess to secure the insertion portion to the catch plate.

3. The imaging device according to claim 1, wherein,
a projection is provided to the insertion portion so as to project toward the catch plate,
a recess is provided in the catch plate so as to receive the projection, and
the projection is fitted in the recess to secure the insertion portion to the catch plate.

* * * * *